(12) United States Patent
Sage et al.

(10) Patent No.: US 6,312,770 B1
(45) Date of Patent: Nov. 6, 2001

(54) LIQUID CRYSTAL ELASTOMERS

(75) Inventors: Ian C Sage; Keith M Blackwood; Michelle Jones, all of Malvern; Mark A Verrall; David Coates, both of Poole, all of (GB)

(73) Assignees: The Secretary of State for Defence in Her Brittanic Majesty's Government of the United Kingdom of Great Britian and Northern Ireland; Defence Research Agency, both of Farnborough (GB)

(*) Notice: Subject to any disclaimer, the term of this patent is extended or adjusted under 35 U.S.C. 154(b) by 0 days.

(21) Appl. No.: 09/091,746
(22) PCT Filed: Jan. 6, 1997
(86) PCT No.: PCT/GB97/00005
   § 371 Date: Apr. 12, 1999
   § 102(e) Date: Apr. 12, 1999
(87) PCT Pub. No.: WO97/25649
   PCT Pub. Date: Jul. 17, 1997

(30) Foreign Application Priority Data

Jan. 4, 1996 (GB) .................................................. 9600124

(51) Int. Cl.⁷ .......................... C09K 19/38; G02F 1/1333
(52) U.S. Cl. ........................ 428/1.1; 428/1.3; 252/299.01
(58) Field of Search .................. 252/299.01; 428/1.1, 428/1.3

(56) References Cited

U.S. PATENT DOCUMENTS

| | | | | |
|---|---|---|---|---|
| 5,039,208 | * | 8/1991 | Ohnishi et al. | 359/100 |
| 5,073,294 | * | 12/1991 | Shannon et al. | 252/299.01 |
| 5,359,253 | * | 10/1994 | Hikmet | 310/357 |
| 5,385,690 | * | 1/1995 | Finkelmann et al. | 252/299.01 |
| 5,401,437 | * | 3/1995 | Im | 252/299.01 |
| 5,668,614 | * | 9/1997 | Chien et al. | 349/115 |

FOREIGN PATENT DOCUMENTS

| | | |
|---|---|---|
| 0 293 911 | 12/1988 | (EP) . |
| 293 870 | 12/1988 | (EP) . |
| 0 445 629 | 9/1991 | (EP) . |
| 0 669 548 | 8/1995 | (EP) . |
| WO 96 12209 | 4/1996 | (WO) . |
| WO 97 04349 | 2/1997 | (WO) . |

* cited by examiner

Primary Examiner—Shean C. Wu
(74) Attorney, Agent, or Firm—Nixon & Vanderhye

(57) ABSTRACT

This invention describes a method for the loading and alignment of elastomers in electro-optic and electro-active devices. It comprises the in-situ polymerization between substrates of liquid crystal monomers in the presence of cross-linking reagents. It also describes the production of free-standing elastomer films.

25 Claims, 6 Drawing Sheets

LIQUID CRYSTAL ELASTOMERS

This application is a 35 U.S.C. 371 of PCT/GB97/00005 filed Jan. 6, 1997.

This invention relates to liquid crystal elastomers and their use in devices and methods for making devices incorporating liquid crystal elastomers.

The unit that is the basic building block of a polymer is called a monomer.

The polymerisation process i.e. the formation of a polymer from its constituent monomers does not usually create polymers of uniform molecular weight, rather what is created is a distribution of molecular weights. In order to describe a sample of polymer it is necessary to state the average number of monomers in a polymer, this is called the degree of polymerisation (D.P). By how much the majority of polymer molecules differ from this average value (or to describe the spread of molecular weight) is called the polydispersity.

A number of different average molecular weights can be drawn from gel permeation chromatography (GPC) for a given sample including: Mn—number average molecular weight and Mw—weight average molecular weight. The value used to calculate D.P. is usually Mn and polydispersity is usually defined as Mw/Mn.

Polymers can be made from different types of monomers, in which case the polymer is called a co-polymer. If two types of monomer join in a random fashion then the polymer is called a random co-polymer. If the two monomers form short sequences of one type first which then combine to form the final polymer then a block copolymer results. If short sequences of one of the monomers attach themselves as side chains to long sequences consisting of the other type of monomer then the polymer is referred to as a graft copolymer.

In liquid crystal polymers the monomers can be attached together in essentially two ways. The liquid crystal part or mesogenic unit of the polymer may be part of the polymer backbone resulting in a main chain polymer, alternatively the mesogenic unit may be attached to the polymer backbone as a pendant group i.e. extending away from the polymer backbone; this results in a side-chain polymer. These different types of polymer liquid crystal are represented schematically below. The mesogenic units are depicted by the rectangles.

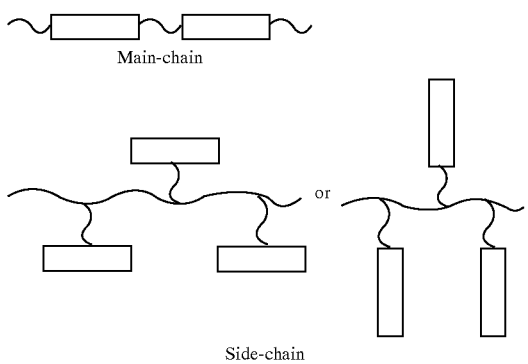

Main-chain or

Side-chain

The side chain liquid crystal polymer can generally be thought of as containing a flexible polymer with rigid segments (the mesogenic unit) attached along its length by short flexible (or rigid) units. It is the anisotropic, rigid section of the mesogenic units that display orientational order in the liquid crystal phases. In order to affect the phases exhibited by the liquid crystal and the subsequent optical properties there are many features which can be altered, some of these features are particularly pertinent to side-chain liquid crystal polymers. One of these features is the flexible part that joins the mesogenic unit to the polymer backbone which is generally referred to as a spacer; the length of this spacer can be altered, its flexibility can also be altered.

A number of side-chain liquid crystal polymers are known, for example see GB 2146787 A.

Liquid crystal polyacrylates are known class of liquid crystal polymer (LCP). LCPs are known and used in electro-optic applications, for example in pyroelectric devices, non-linear optical devices and optical storage devices. For example see GB 2146787 and Makromol. Chem. (1985), 186 2639–47.

Side-chain liquid crystal polyacrylates are described in Polymer Communications (1988), 24, 364–365 e.g. of formula:

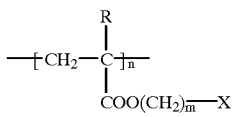

where $(CH_2)_m$—X is the side-chain mesogenic unit and R is hydrogen or alkyl.

Side-chain liquid crystal polychloroacrylates are described in Makromol. Chem. Rapid Commun. (1984), 5, 393–398 e.g. of fonnula:

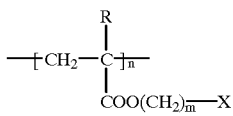

where R is chlorine.

A method for the preparation of polyacrylate homo- or co-polymers having the following repeat unit is described in UK patent application GB 9203730.8

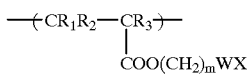

$R_1$ and $R_2$ are independently alkyl or hydrogen, $R_3$ is alkyl, hydrogen or chlorine, m is O or an integer 1–20, W is a linkage group COO or OOC, O and X is a mesogenic group, One of the main problems with polymer liquid crystals is that they are extremely difficult to align in devices. Essentially there are two techniques which have been used for aligning polymer liquid crystals. It is possible to try to align the liquid crystal polymer in a similar manner as a low molar mass liquid crystal, which is described in more detail below. Alternatively, mechanical techniques can be used such as shearing. Typically, mechanical shearing is performed over hot rollers, this technique is generally only suitable for flexible substrates. It is possible to shear a sample between glass slides however the glass slides cannot be sealed in the conventional manner.

Materials and Assembling Process of LCDs by Morozumi in Liquid Crystals Applications and uses, vol 1 Ed. Bahadur, World Scientific Publishing Co, Pte. Ltd, 1990 pp 171–194 and references therein as the title suggests discusses methods for assembling liquid crystal devices.

The technique for aligning low molar mass liquid crystals is typically as follows. Transparent electrodes are fabricated on the surfaces of the substrates, the substrates typically being made of glass e.g. glass slides. In twisted nematic or super twisted nematic devices, for example, an alignment process is necessary for both substrates. A thin alignment layer is deposited to align the liquid crystal molecules, typically either organic or inorganic aligning layers are used, for example SiO deposited by evaporation is a typical inorganic alignment layer. One method to form the alignment layer involves rubbing the surface by textures or cloths. Polyimides have also been employed for the surface alignment layers. Polymide is coated onto the substrates bearing electrodes by a spinner and then cured to form a layer of approximately 50nm thickness. Then each layer surface is repeatedly rubbed in substantially one direction with an appropriate material. If the liquid crystal molecules are deposited on this layer they are automatically aligned in the direction made by the rubbing. It is often preferable if the molecules possess a small angle pre-tilt typically 2–3°. Higher pre-tilts are sometimes required.

The two substrates are then fixed together for example by adhesive and are kept separate by spacing materials. This results in uniform and accurate cell spacing. A typical adhesive is an epoxy resin. This sealing material is usually then precured. The electrodes may then be precisely aligned for example to form display pixels. The cell is then cured at, for example 100–150° C. At this point the empty liquid crystal cell is complete.

It is at this point that the cell is filled with liquid crystal material. The opening size in the sealing area of the liquid crystal cell is rather small therefore the cell can be evacuated, for example in a vacuum chamber, and the liquid crystal forced into the cell via gas pressure. More than one hole in the sealing area may be used. The empty cell is put into a vacuum chamber and then the vacuum chamber is pumped down. After the cell has been evacuated the open region of the sealant is dipped into the liquid crystal material and the vacuum chamber is brought back to normal pressure. Liquid crystal material is drawn into the cell as a result of capillary action, external gases can be applied to increase the pressure. When the filling process is complete the hole or holes in the sealant is/are capped and the cell is cured at a temperature above the liquid crystal material clearing point to make the liquid crystal molecular alignment stable and harden the capping material.

Polymer liquid crystal molecules tend to be more viscous than low molecular weight liquid crystal materials and are therefore more difficult to align and more difficult to fill into devices. Only liquid crystal polymers with low molecular weights can be flow filled into a cell, and once a degree of polymerisation greater than around 30 or 40 repeat units is reached, most liquid crystal polymers become so viscous that flow filling cells is extremely difficult. Much slower cooling is needed in order to try and align liquid crystal polymers and this usually results in poor uniformity of alignment.

Poorly aligned liquid crystal molecules do not result in the fast switching high contrast materials and devices that are generally required.

The above techniques are suitable for many liquid crystal materials including those devices which use liquid crystal materials which exhibit and utilise the smectic mesophase e.g. ferroelectrics. Suitable alignment techniques may also be found in GB 2210469 B.

GB 9420632.3 describes inter alia a method of making liquid crystal devices comprising liquid crystal polymers using chain transfer reagents.

Devices containing ferroelectric liquid crystal mixtures can exhibit fast switching times (faster than 100 $\mu$s), Clark and Lagerwall, Appl. Phys. Lett., 36, 89, 1980. They can be bistable which means that they can be multiplexed at high levels using a line-at-a-time scan technique. Ferroelectric materials continue to receive a large amount of investigative attention due to their application in high resolution flat panel displays. An important feature of devices containing liquid crystalline materials is that they should exhibit a fast response time. The response time is dependent on a number of factors, one of these being the spontaneous polarisation, denoted Ps (measured in nC cm$^{-2}$). By adding a chiral dopant to the liquid crystalline mixture the value of Ps can be increased, thus decreasing the response time of the device. Ferroelectric smectic liquid crystal materials, which can be produced by mixing an achiral host and a chiral dopant, use the ferroelectric properties of the tilted chiral smectic C, F, G, H, I, J, and K phases. The chiral smectic C phase is denoted $S_C^*$ with the asterisk denoting chirality. The $S_C^*$ phase is generally considered to be the most useful as it is the fastest switching. It is desirable that the material should exhibit a nematic (denoted N) and $S_A$ phase at temperatures above the chiral smectic phase in order to assist surface alignment in a device containing liquid crystalline material. Ferroelectric smectic liquid crystal materials should ideally possess the following characteristics: low viscosity controllable Ps and an $S_C^*$ phase that persists over a a broad temperature range, which should include ambient temperature, and exhibits chemical and photochemical stability. Materials which possess these characteristics offer the prospect of very fast switching liquid crystal containing devices.

Ferroelectric LCDs by Dijon in Liquid Crystals Applications and Uses, vol 1 Ed. Bahadur, World Scientific Publishing Co. Pte. Ltd, 1990 pp 350–360 and references therein discusses alignment processes for smectic phases for low molar mass materials. The filling of cells is believed to be possible only in the isotropic or nematic phase due to the viscosity of smectic phases. Generally materials with the following phase sequence give good alignment:

$$I\text{—}N^*\text{—}S_A\text{—}S_C^* \text{ or } I\text{—}S_A\text{—}S_C^*$$

whereas materials with the following phase sequences are more difficult to align:

$$I\text{—}N^*\text{—}S_C^*$$

Typically, therefore, in order to use a liquid crystal material in the smectic phase it will involve heating the material to the nematic or isotropic phase and allowing it to cool slowly into an aligned smectic state. Should this technique be applied to a polymer liquid crystal material then the cooling time is usually very much longer in order to assist the alignment, though very often the alignment is poor.

One type of liquid crystal polymer is known as a liquid crystal elastomer. Elastomers, in general, are essentially cross-linked polymers.

SUMMARY OF THE INVENTION

This invention provides means for producing liquid crystal elastomers and their applications in devices.

According to this invention a method of making an electro-optic device comprises the steps; forming a cell comprising two cell walls spaced apart, the walls inner surfaces having formed thereon electrode structures, providing a mixture of monomer material and cross-linking reagent, introducing the mixture between the cell walls, polymerising the mixture.

Preferably at least one wall is surface treated to provide liquid crystal alignment.

Preferably a photoinitiator or a thermal initiator is added to the mixture.

The cross-linking agent may be an isotropic or a liquid crystalline material.

The monomer material may be aligned before polymerisation and/or the elastomer may be aligned after polymerisation. The monomer may be present in any of the known liquid crystal phases including nematic, cholesteric or smectic.

Preferably the polymerisation is carried out under UV light and/or in the presence of additional heat.

Alternative known means of polymerisation may be employed including exposure to γ rays, x-rays and exposure to a charged particle beam e.g. an electron beam.

An AC or DC voltage bias or a thermal bias may be applied to the mixture during polymerisation. A combination of AC, DC, thermal bias may be applied to the cell during polymerisation, in particular a combination of DC voltage bias plus thermal bias may be used.

Electro-active devices may also be made according to the methods of the present invention—such devices include sensors, for example piezoelectric and pyroelectric devices.

The cell walls may be substantially rigid or at least one of them may be substantially flexible; such a cell may be used to manufacture a thin layer of elastomer or a free-standing elastomer film. In this method the electrodes are not necessary however the cell walls may carry electrode layers allowing an electric field to be applied before, during and/or after the polymerisation. An aligned layer of elastomer is produced as above. At least one of the substantially flexible cell walls is removed, e.g. by peeling away from the aligned elastomer layer. If required, electrodes can be formed on at least one of the layers in particular on at least one surface of the elastomer layers; for example the electrodes may be made from Indium Tin Oxide, Aluminium or Gold. Electrodes may also be constructed from conducting polymer or a combination of the above. The electrodes may or may not be transparent. The layer or layer and electrodes may be mounted onto one support or between supports. Such a method may be useful in producing pyroelectric, piezoelectric and other electro-active devices, for example sensors; such a method may also be useful for electro-optic switches or displays. Ferroelectric devices may also be made using such a method.

BRIEF DESCRIPTION OF THE DRAWINGS

The invention will now be described by way of example only with reference to the following diagrams.

Figure 4:
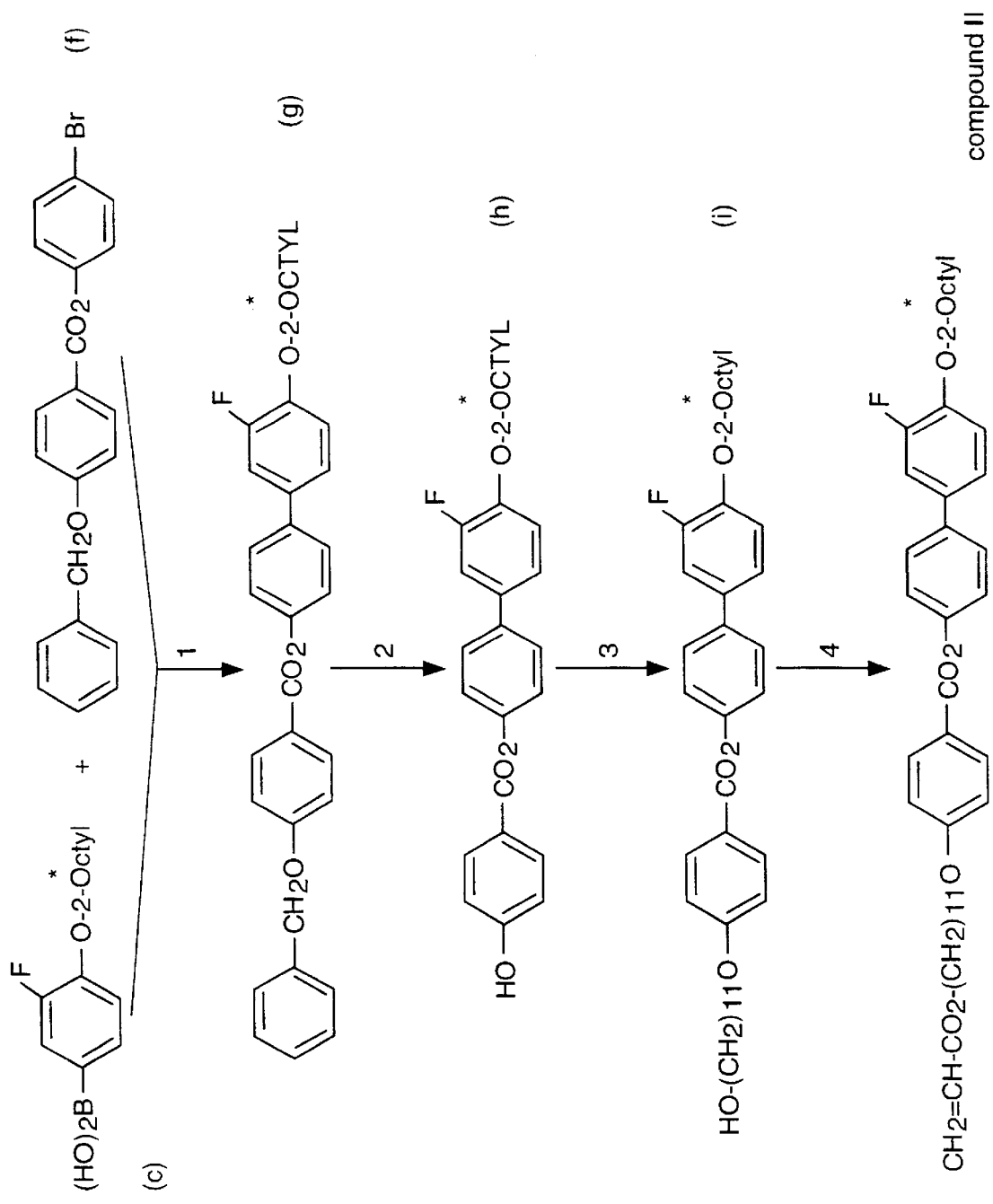
FIG. 4 is a synthetic scheme for the preparation of acrylate monomer compound II.
Figure 4A:
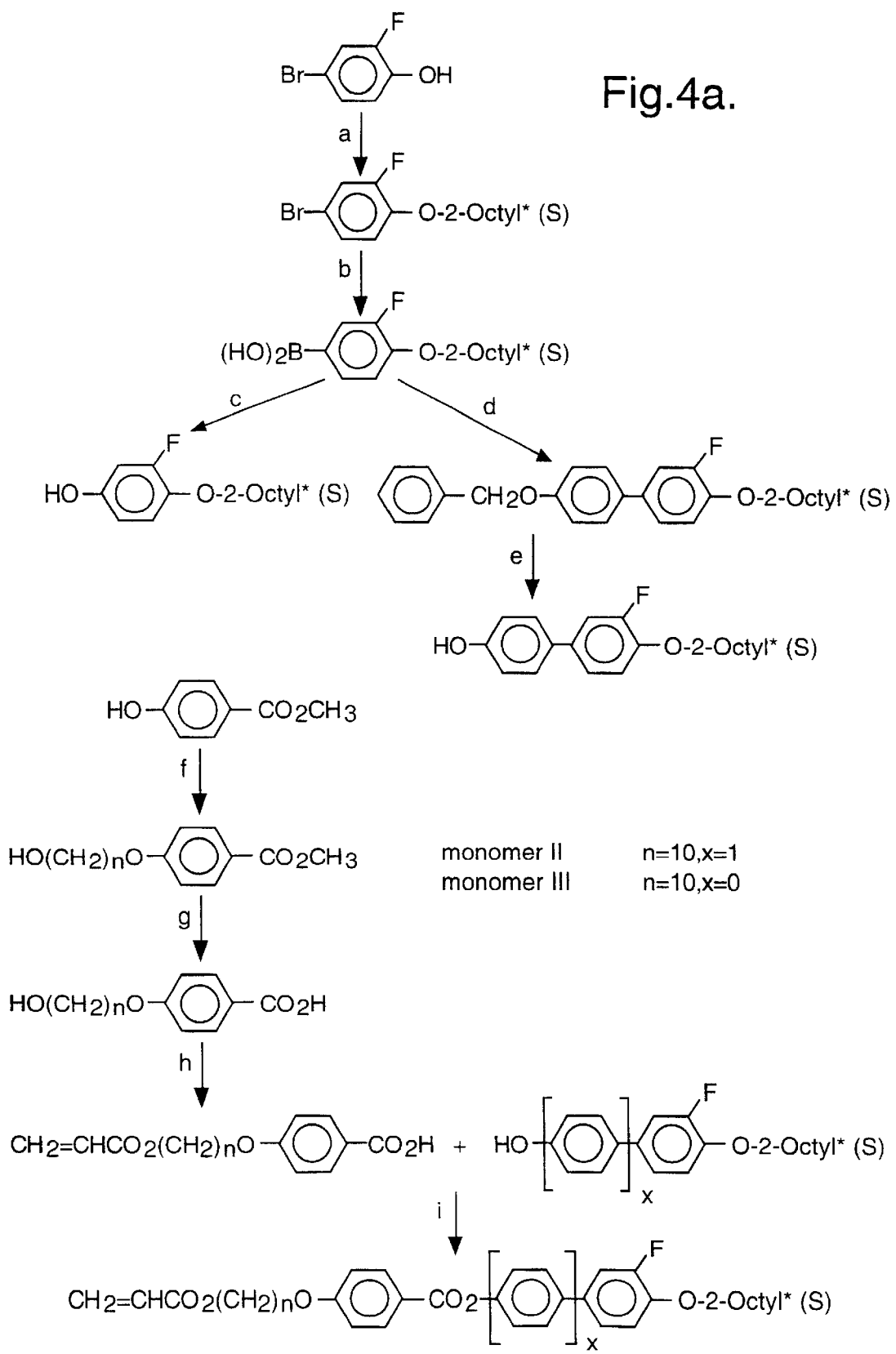
FIG. 4a is a synthetic scheme for the preparation of monomers II and III.

Reagents used in FIG. 4a are as follows:

a/ (R)-(−)2-Octanol, DEAD, $PPh_3$, THF;
b/ Mg, $B(OMe)_3$, THF, HCl(aq);
c/ $H_2O_2$, THF;
d/ Toluene, $Na_2CO_3$, $Pd(PPh_3)_4$, Ph—$CH_2$O—PhBr;
e/ $H_2$(g), Pd/C (5%), THF;
f/ $HO(CH_2)_n$Br, $K_2CO_3$, butanone;
g/ KOH, IMS, $H_2O$;
h/ $CH_2$=CHCOCl, $NEt_3$, DCM;
i/ TFAA, DCM.

DETAILED DESCRIPTION OF THE INVENTION

Figure 1:
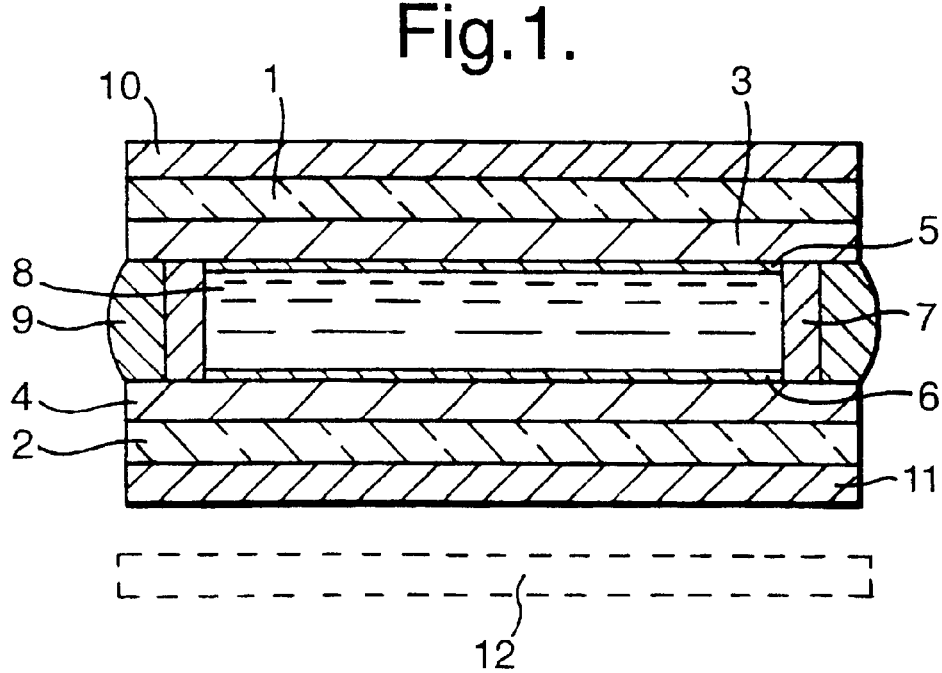
FIG. 1 is a representation of a liquid crystal cell containing a mixture described by the current invention.

An example of the use of a material and device embodying the present invention will now be described with reference to FIG. 1.

The liquid crystal device consists of two transparent plates, 1 and 2, for example made from glass. These plates are coated on their internal face with transparent conducting electrodes 3 and 4. An alignment layer is introduced onto the internal faces of the cell so that a planar orientation of the molecules making up the liquid crystalline material will be approximately parallel to the glass plates 1 and 2. This is done by coating the glass plates 1,2 complete with conducting electrodes 3,4 with layers of film 5 and 6 of a suitable polymer, eg polyirnide. The electrodes 3,4 may be formed into row and column electrodes so that the intersections between each column and row form an x, y matrix of addressable elements or pixels. Prior to the construction of the cell the films 5,6 are rubbed with a roller covered in cloth (for example made from velvet) in a given direction, the rubbing directions being arranged parallel (same or opposite direction) upon construction of the cell. A spacer 7 eg of polymethyl methacrylate separates the glass plates 1 and 2 to a suitable distance eg 2 microns. Liquid crystal material 8 is introduced between glass plates 1,2 by filling the space in between them. This may be done by flow filling the cell using standard techniques. The spacer 7 is sealed with an adhesive 9 in a vacuum using an existing technique. Polarisers 10, 11 may be arranged in front of and behind the cell.

Alignment layers may be introduced onto one or more of the cell walls by one or more of the standard surface treatment techniques such as rubbing, oblique evaporation or as described above by the use of polymer aligning layers.

The device may operate in a transmissive or reflective mode. In the former, light passing through the device, eg from a tungsten bulb, is selectively transmitted or blocked to form the desired display. In the reflective mode a mirror, or diffuse reflector, (12) is placed behind the second polariser 11 to reflect ambient light back through the cell and two polarisers. By making the mirror partly reflecting the device may be operated both in a transmissive and reflective mode.

In an alternative embodiment a single polariser and dye material may be combined.

The liquid crystal material 8 when introduced into the cell consists of at least one type of liquid crystal monomer and at least one type of cross-linking agent. It may also contain a photoinitiator and/or thermal initiator.

The monomer material may be aligned before polymerisation using standard techniques, for example by heating up to and cooling from the isotropic phase or from a liquid crystal phase such as a nematic or chiral nematic phase. It is also possible that the liquid crystal polymer may be aligned by one or more techniques including the use of surface forces, shear alignment or field alignment. Typically in shear alignment the liquid crystal material is placed on a substrate, which may be polyethersulphone (PES) coated with Indium Tin Oxide (ITO) and an aluminium grid. This is then sheared between another substrate. After polymerisation the substrates may then be separated to yield a free standing film.

It is possible that following polymerisation there may still be some amount of monomer material remaining. This may be unreacted monomer or low molar mass additives which do not bear polymerisable groups.

Typically, reagents which may be used to limit the molecular weight of the polymer possess one or more thiol groups. These may be low molecular weight materials which may or may not exhibit liquid crystalline behaviour or they may be more complex molecules, in particular they may possess similar structures to the monomer which will be the basic building block for the elastomer material.

Polymerisation may be carried out by using any of the known techniques. For example the monomer material plus cross-linking agents (the mixture) or mixture plus chain transfer reagent may also contain a photoinitiator and be exposed to UV light. In addition to exposing such samples to Lw light, heat may also be applied to assist the polymerisation reaction. Heat may be applied to permit polymerisation within a given phase of the monomer and/or elastomer. Care is taken during polymerisation due to the light sensitive nature of some of the materials. Polymerisation may be carried out under darkened conditions.

Alternatively the polymerisation process may take place in the presence of heat and a thermal initiator. However if this technique is used it is preferable if it is carried out at a temperature which corresponds to a liquid crystal phase of the monomer material.

The elastomers described by the current invention may be made from any of the known types of polymer e.g. homopolymers, copolymers, block copolymers etc.

Any suitable cross-linking agent may be used. A number of examples are as follows, the first two being commercially available from Aldrich Chemical Company Limited:
pentaerythritol tetraacrylate (referred to as tetra)

1.6-Hexanediol diacrylate(referred to as di)

RLC1

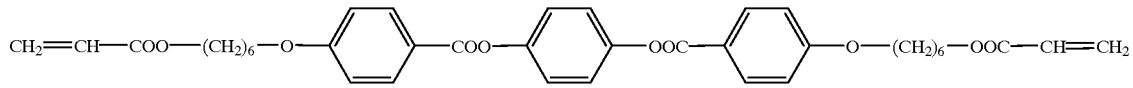

RLC1 is available from Merck Ltd, Poole, Dorset, UK.

EXAMPLE 1
(polymer referred to as LCP145)
liquid crystal monomer II:

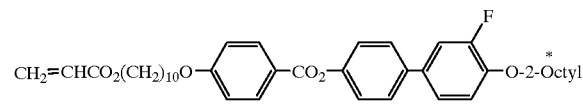

Figure 3:
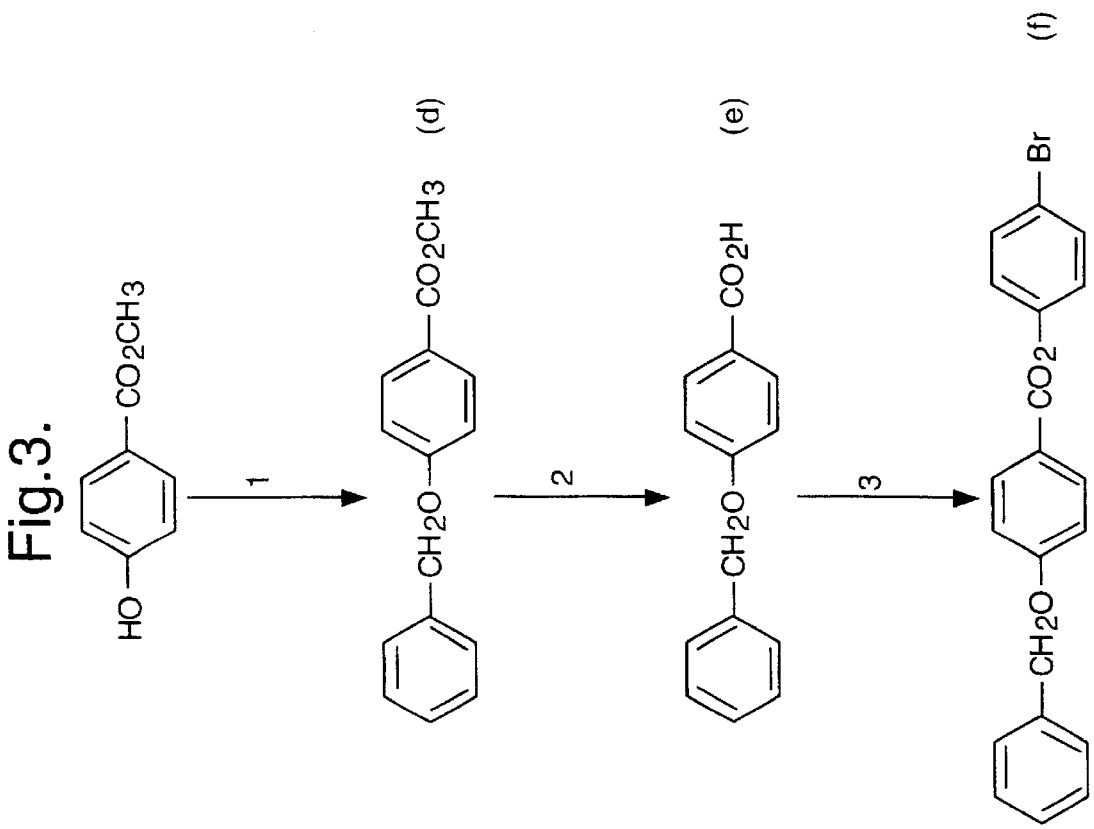
FIG. 3 is a synthetic scheme for the preparation of intermediate (f)
Figure 2:
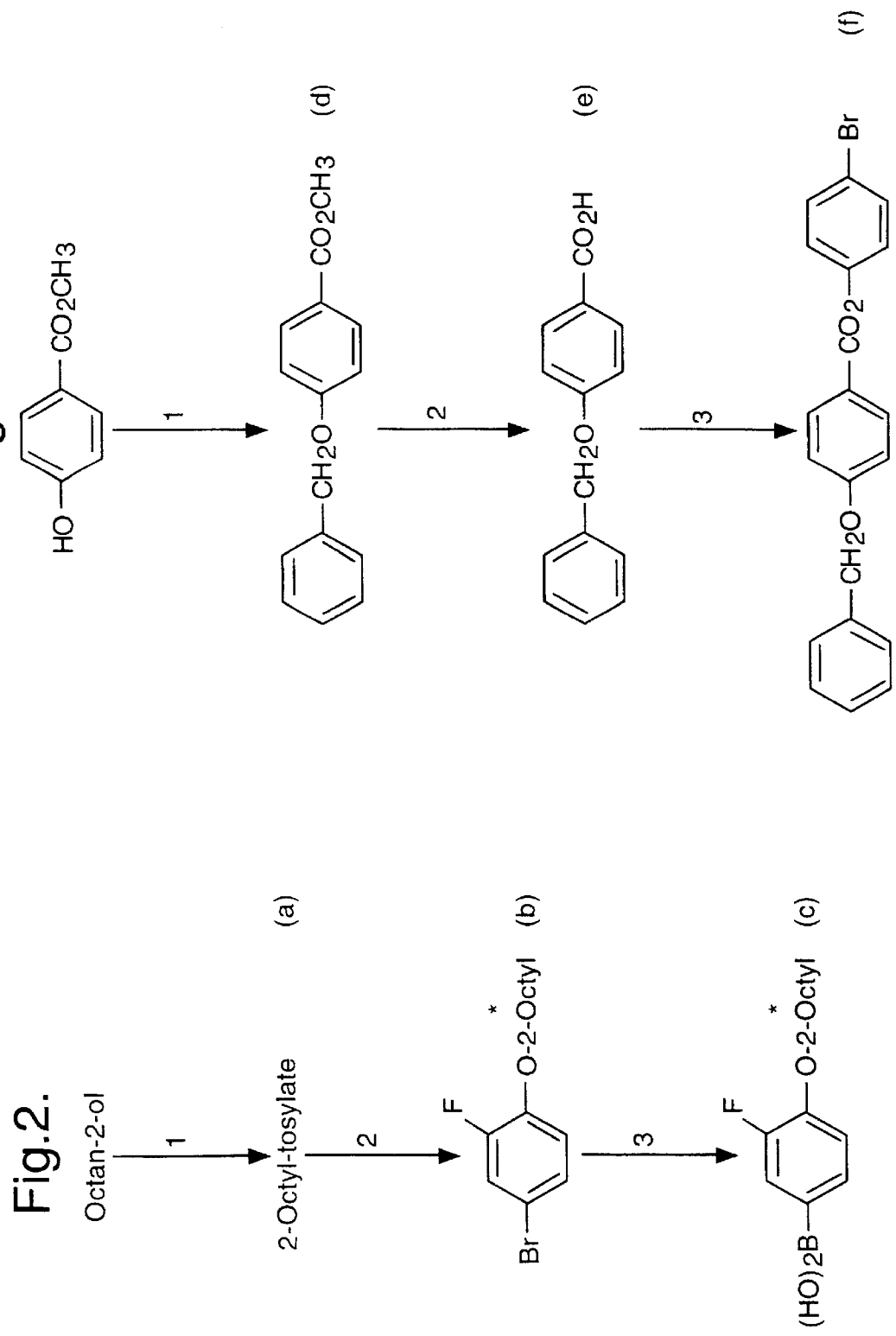
FIG. 2 is a synthetic scheme for the preparation of intermediate (c)

The monomer was synthesised using the methods outlined in FIGS. 2, 3 and 4. Polymerisation of the relevant monomer was carried out using Stag ST78 Eprom Eraser (UV lamp) using 1% (w/w) Darocur 1173 as the initiator.

Analysis of purity was carried out using a Hewlett Packard HPLC 1090 with a Merck RP18 5 μm column eluted with graduated mixtures of acetonitrile/water, and with a Perkin Elmer GC 8500. Molecular weight data of polymers were determined by gel permeation chromatography on a Polymer Laboratories 10 μm and Merck Lichrogel PS400 10 μm column in series, eluted with tetrahydrofuran and calibrated against Polymer Laboratories standards with molecular weights ranging from Mp=1,060 to 3,040,000. Thermal analysis was carried out using a TA Instruments 2910 Modulated DSC.

The silica gel used for column chromatography was standard grade BDH silica gel (particle size 0.13–0.25 mm for gravity columns, and Merck silica (0.040–0.063 mm) for flash chromatography. Petrol used for chromatography was BDH GPR petroleum spirit boiling range 40–60° C.
Preparation of Intermediate (a): FIG. 2, step 1.

R-(-)-2-Octanol (50.0 g, 0.385 mol) and tosyl chloride (87.9g, 0.461 mol) were stirred in dichloromethane (300 ml) in a bath of ice and acetone. To this was added dropwise, whilst stirring, pyridine (37.3 ml, 0.462 mol.) ensuring that the temperature did not exceed 0° C. When all of the pyridine had been added, the mixture was stirred for 18 h whilst allowing the temperature to rise to room temperature. The product was purified by column chromatography on silica using petrol as eluent. Yield=48 g (44% yield). Purity=97.2% (g.c.). $\lambda_{max}$(hplc)=224 nm.
Preparation of Intermediate (b): FIG. 2, step 2.

Intermediate (a) (32.7 g, 0.115 mol.), 4-bromo-2-fluorophenol (24.1 g, 0.126 mol.) and potassium carbonate (31.8 g, 0.230 mol.) were combined in butanone (250 ml) and heated under reflux gently in a nitrogen atmosphere for 24 h. After allowing the reaction mixture to cool to room temperature, water (400 ml) was added and shaken with the mixture. The aqueous layer was separated and extracted with ether (2×250 ml), This organic layer was combined with the original organic solution, washed with water (2×200 ml) dried over anhydrous sodium sulphate and the solvent removed on a rotary evaporator. The crude product (purity (gc)=72.6%) was purified by column chromatography on silica using petrol as eluent. Yield=29.1 g (84% yield). Purity=98.0% (hplc), 95.0% (gc). $\lambda_{max}$(hplc)=226 nm.
Preparation of Intermediate (c): FIG. 2, step 3.

Magnesium (5.2 g, 0.217 mol.) in tetrahydrofuran (10 ml) was stirred in a nitrogen atmosphere, Intermediate (b) was dissolved in a tetrahydrofuran (100 ml) and a little of this solution added to the magnesium in tetrahydrofuran. A single crystal of iodine was added and the mixture was warmed to a gentle reflux. Once the solution had begun to turn grey-blue in colour, the heat was removed and the remaining bromobenzene in tetrahydrofuran was added dropwise at a sufficient rate that the exothermic reaction supported continuous reflux of the reaction mixture. When the addition was complete, the heating was continued to support gentle reflux for a further two hours. The reaction mixture was cooled in ice and trimethylborate (22.5 g, 0.216 mol.) in tetrahydrofuran 20 ml) was added slowly whilst stirring, and the mixture stirred for another half hour at 0–5° C. Hydrochloric acid (20% aqueous solution, 95 ml) was added carefilly and stirred well for about fifteen minutes. The product was extracted into diethyl ether (200 ml) and shaken with water (2×100 ml). The ether layer was dried over anhydrous sodium sulphate and the solvent removed on a rotary evaporator. Yield=43.3 g (90% yield). Purity=46.5% plus 38.0% boronic acid (hplc).
Preparation of Intermediate (d): FIG. 3, step 1.

Benzyl chloride (229 g, 1.81 mol.) methyl4-hydroxybenzoate (250 g, 1.65 mol), potassium carbonate (340 g, 2.46 mol and butanone (1,200 mL.) were combined and gently heated under reflux for 48 h. After allowing to cool, the solid was filtered off and washed with butanone (3×200 ml). The combined butanone fractions were reduced on a rotary evaporator to an off white solid which was dissolved in dichloromethane (700 ml), washed with water (3×300 ml), dried over anhydrous sodium sulphate and the solvent removed on a rotary evaporator. Yield=395 g (98.9% yield). Purity=99.3% (hplc). $\lambda_{max}$(hplc)=254nm.

Preparation of Intermediate (e): FIG. 3, step 2.

Intermediate (d) (395 g, 1.64 mol.), potassium hydroxide (184 g, 3.28 mol.), industrial methylated spirit (1,000 ml) and water (1,300 ml) were combined and gently heated under reflux for 3 h (reaction was monitored by tlc). After allowing to cool, the reaction mixture was added to cold water (ISOOml) and acidified to pH 2–5 with concentrated hydrochloric acid. The product precipitated out and was filtered off before recrystallisation from hot ethanol. Yield= 265 g. Purity=99.7% (hplc)

Preparation of Intermediate (f): FIG. 3, step 3.

Intermediate (e) (45 g, 0.20 mol.) and 4-bromophenol (31 g, 0.18 mol.) were combined with dichloromethane (1000 ml) and stirred at room temperature whilst trifluoroacetic anhydride (38 ml, 0.27 mol) was added slowly. The mixture was stirred for 24 h, washed with sodium hydrogen carbonate (5% solution, 2×1000 ml) and water (1000 ml) before drying over anhydrous sodium sulphate and removing the solvent on a rotary evaporator. The crude product was recrystallised from ethanol. Yield=46 g (67% yield). Purity=98.2% (hplc). Preparation of Intermediate (g): FIG. 4, step 1

Intermediate (f) (13.0 g, 0.034 mol.) was dissolved in toluene (90 ml) and tetrakis (triphenylphosphine) palladium (0) (0.1 g, catalytic) was added whilst stirring in a nitrogen atmosphere. Sodium carbonate (2M solution, 45 ml) was then added followed by intermediate (c) (10.0 g 0.037 mol.) in IMS (25 ml) and the mixture heated under reflux in a nitrogen atmosphere for 48 h. After allowing to cool, water (200 ml) was added and the product separated into toluene (200 ml). The organic layer was washed with water (2×100 ml), dried over anhydrous sodium sulphate and the solvent removed on a rotary evaporator. The crude product was recrystallised from ethanol. Yield=11.3 g (63% yield). Purity=97.5% (hplc). $\lambda_{max}$(hplc)=268 nm.

Preparation of Intermediate (h): FIG. 4, step 2.

Intermediate (g) (1 1.3 g, 0.0215 mol.) was dissolved in ethyl acetate (200 ml) in a 500 ml flask and 5% palladium on charcoal (0.6 g, catalytic) in ethyl acetate (5 ml) was added. The vessel was evacuated and flushed with argon three times, and then evacuated and flushed with hydrogen. The mixture was then stirred vigorously under hydrogen for 48 h. The catalyst was filtered off and the solvent removed on a rotary evaporator. Yield=8.2 g, (89% yield). Purity=97.8% (hplc). $\lambda_{max}$(hplc)=268 nm.

Preparation of Intermediate (i): FIG. 4, step 3.

Intermediate (h) (6.0 g, 0.014 mol.) was combined with 10-bromodecan-1-ol (3.5 g, 0.015 mol.), potassium carbonate (3.8 g, 0.028 mol.) and butanone 40 ml, and gently heated under reflux whilst stirring for 20 h. When cool, water (30ml) was added, the mixture stirred briefly and layers separated. The aqueous layer was extracted with dichloromethane (2×20 ml), the dichlororomethane layers combined with the butanone layer and washed again with water (20 ml) before drying over anhydrous sodium sulphate and removing the solvent on a rotary evaporator. The product was recrystallised from ethanol and then flash columned on silica eluting with 30% dichloromethane in petrol. Yield=4.2 g (51%). Purity=98.7%, $\lambda_{max}$(hplc)=268 nm.

Preparation of Monomer Compound II: FIG. 4, step 4.

Intermediate (i) was combined in a 50 ml flask with acryloyl chloride (0.72 g. 0.0079 mol) and dichloromethane (25 ml) and stirred at room temperature whilst adding dropwise triethylamine (2 ml). A calcium chloride drying tube was fitted and the mixture stirred at room temperature for 18 h. The mixture was diluted with further dichloromethane (30 ml) and washed with hydrochloric acid (10% aqueous solution, 30 ml) and water (2×30 ml), dried over anhydrous sodium sulphate and the solvent removed on a rotary evaporator. The product was purified by flash column chromatography on silica, using dichloromethane/petrol (1:1) as eluent. Yield=2.7 g. Purity=96.9% (hplc). $\lambda_{max}$ (hplc)=268 nm.

Polymerisation of Compound II in Solution.

All glassware used in the following preparation was first dried thoroughly in a hot oven (110° C.). Monomer (II) (1.0 g) was dissolved in dry 1,2-dichloromethane (20 ml) and the free radical initiator azoisobutyronitrile (0.01 g) was added. The vessel was evacuated and flushed with nitrogen three times before stirring the mixture in a static nitrogen atmosphere in an oil bath at 60° C. for 48 h. After allowing to cool, the mixture was poured into cold ethanol (0–5° C.) and an off-white solid precipitated. The solid was filtered off, dissolved in a little dichloromethane (5 ml) and poured again into cold ethanol. The polymer was examined for residual monomer by gel permeation chromatography and this process of reprecipitation repeated until no monomer remained in the sample. Yield=0.56 g (56% yield). No monomer was detectable by GPC.

Alternative Method for the Preparation of Intermediate (b)

4-bromo-2-fluorophenol (27.9 g) was combined with (–)-2-octanol (20.0 g) and diethylazodicarboxylate (25.4 g) and dissolved in tetrahydrofuran (200 ml). Triphenylphosphine (38.2 g) was taken up in THF (100 ml) and added slowly, whilst keeping the reaction mixture cool in an ice bath. The mixture was stirred at room temperature for 24 h under an atmosphere of nitrogen. The THF was removed on a rotary evaporator, the products taken up in dichloromethane (250 ml), washed with water (2×150 ml), the solution dried over anhydrous sodium sulphate and the solvent removed on a rotary evaporator. The crude product was purified by flash chromatography on silica using petrol as eluent. Yield 24.3 g (55% yield). Purity 96.50% (hplc), 96.7% (gc).

Mixture acrylate monomer (compound II), compound III,

Darocur 1173 1%(w/w),

Cross-linking agent.

This mixture was flow filled into 2 $\mu$m cells at 85° C. (isotropic phase), cured under mercury arc lamp.

There are a number of variables which may affect the photopolymerisation of liquid crystal monomers. These include the following:

1/Exposure time to UV source,

2/Phase of monomers and polymer (ie temperature of curing),

3/Concentration of initiator,

4/Intensity of UV light (therefore rate of initiation).

All of these factors may affect one or more of the following: molecular weight, polydispersity, alignment, switching behaviour.

Cross-linking materials were added to a 1:1 mix of polymers made up from the following monomeric materials (polymers made from the monomers II and III are referred to as LCP145 and LCP138 respectively):

II

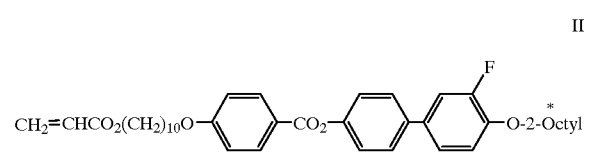

III

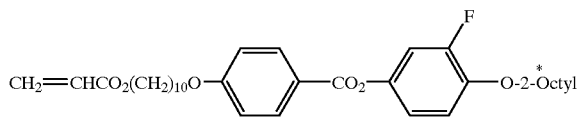

Monomer III was made in a similar manner to that of monomer II (see FIG. 4a for details). DSCs were carried out on free standing films produced as described in the present application.

| Cross-linker | Amount added | | |
|---|---|---|---|
| RLCl | 0.5% | 1% | 2% |
| $T_g$/° C. | −7.7 | 12.2 | 16.0 |
| $S_c$-I/° C. | 45.0 | 31.5 | |
| Tetra | 1% | 2% | |
| TgI/° C. | 33.3 | 24.0 | |
| $S_c$-I/° C. | 121.7 | 94.0 | |
| di | 1% | 2% | |
| $T_g$-$S_A$/° C. | 41.0 | 46.0 | |
| $S_c$-$S_A$/° C. | 31.5 | 67.7 | |
| $S_A$-I/° C. | | 195.0 | |

Response Time were measured in flow filled cells. The times given below are the average of eight readingd. Cross-linking agents were added to a 1:1 mix of monomers II and III prior to polymerisation to form LCP145 and LCP138.

1% Diacrylate Mersured at 1.0 Hz 30V pk to pk

| Temperature/° C. | Response time/ms |
|---|---|
| 40 | 42.5 |
| 45 | 24.3 |
| 50 | 17.3 |
| 55 | 19.6 |
| 60 | 15.9 |
| 65 | 10.5 |
| 70 | 4.4 |
| 75 | 3.1 |

1% RLC1 Measured at 1.0 Hz 30V pk to pk

| Temperature/° C. | Response time/ms |
|---|---|
| 40 | 42.5 |
| 45 | 24.3 |
| 50 | 17.3 |
| 55 | 19.6 |
| 60 | 15.9 |
| 65 | 10.5 |
| 70 | 4.4 |
| 75 | 3.1 |
| 80 | 2.6 |
| 85 | 2.0 |
| 90 | 1.3 |
| 95 | 0.8 |

2% RLC1 Measured at 1.0 Hz 30V pk to pk

| Temperature/° C. | Response time/ms |
|---|---|
| 40 | 54.3 |
| 45 | 45.7 |
| 50 | 77.0 |
| 55 | 65.1 |
| 60 | 32.4 |
| 65 | 29.7 |
| 70 | 22.7 |
| 75 | 19.6 |
| 80 | 13.6 |
| 85 | 6.6 |
| 90 | 1.0 |
| 95 | 0.4 |

The formation of elastomers with a cross-linking agent under an applied DC field may also produce a biased response in the switching times.

The following two tables show the response times in milliseconds against temperature as a function of DC field applied during construction of a cell. Response time A denotes the time taken to switch the device out of the state produced by the biasing field applied during formation, that is, against the direction of the DC field. Response time B denotes the time taken to switch the device back into the state produced by the biasing field, that is, with the direction of the DC field imposed during formation.

The table below represents a 1.1 mixture of monomer II and monomer III plus 0.5% w/w cross-linker di.

| Temp/° C. | A 25v | B 25v | A 50v | B 50v | A 75v | B 75v |
|---|---|---|---|---|---|---|
| 30 | 551 | 648 | 629 | 777 | 948 | 1615 |
| 35 | 658 | 927 | 924 | 823 | 1046 | 1528 |
| 40 | 447 | 795 | 1244 | 990 | 1040 | 1145 |
| 45 | 234 | 410 | 977 | 785 | 743 | 682 |
| 50 | 78 | 136 | 373 | 887 | 261 | 241 |
| 55 | 43 | 47 | 123 | 681 | 78 | 61 |
| 60 | 34 | 35 | 34 | 523 | 43 | 35 |
| 65 | 29 | 30 | 24 | 199 | 30 | 27 |
| 70 | 33 | 24 | 22 | 56 | 30 | 24 |
| 75 | 27 | 25 | 19 | 37 | 24 | 21 |
| 80 | 24 | 25 | 27 | 36 | 25 | 23 |
| 85 | 25 | 25 | 32 | 22 | 25 | 25 |
| 90 | 28 | 29 | 18 | 25 | 25 | 26 |

The table below represents a 1:1 mixture of monomer II and monomer III plus 0.5% w/w cross-linker tetra.

| Temp/° C. | A 25v | B 25v | A 50v | B 50v | A 75v | B 75v |
|---|---|---|---|---|---|---|
| 40 | 915 | 928 | 483 | 927 | 435 | 846 |
| 45 | 686 | 962 | 284 | 638 | 139 | 372 |
| 50 | 432 | 570 | 127 | 314 | 58 | 159 |
| 55 | 172 | 224 | 58 | 85 | 39 | 45 |
| 60 | 65 | 86 | 35 | 37 | 33 | 29 |
| 65 | 35 | 36 | 27 | 24 | 28 | 25 |
| 70 | 29 | 27 | 24 | 26 | 24 | 25 |
| 75 | 25 | 24 | 23 | 25 | 21 | 27 |
| 80 | 25 | 25 | 25 | 23 | 25 | 27 |
| 85 | 23 | 25 | 23 | 29 | 24 | 25 |
| 90 | 23 | 25 | 22 | 27 | 25 | 21 |

The cells, when attached to an electrometer or other current measuring device, exhibit a polarisation dependence either on applied stress or rate of temperature change thus showing ppiezoelectric and pyroelectric properties.

One advantage of this biasing is that the device can be restored to its original configuration by the elastic forces introduced by the biasing field. Thus sensor devices could be made to re-set themselves after sensing.

The methods of the present invention may also be used to make pyroelectric devices for example detectors, stearing arrays and vidicon cameras. Similarly, the compounds of the present invention may be used in such devices.

Figure 5:
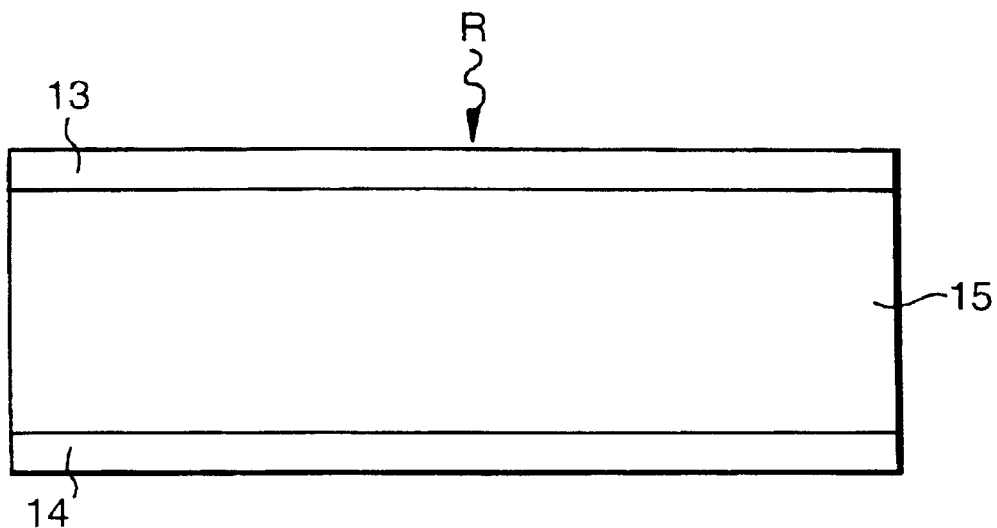
FIG. 5: illustrates a pyroelectric device.

FIG. 5 illustrates a simple pyroelectric detector in which the materials of the present invention may be incorporated, such a detector may also be made according to the methods described by the present invention.

A pyroelectric detector consists of electrode plates 13,14 at least one of which may be pixellated. In operation the detector is exposed to radiation R, for example infrared radiation, which is absorbed by the electrode 13. This results in a rise in temperature which is transmitted to a layer of pyroelectric material 15 by conduction. The change in temperature results in a thermal expansion and a charge is generated. This change in charge is usually small when compared with the charge output due to the change in the spontaneous polarisation, Ps with a change in temperature; this constitutes the primary pyroelectric effect. A change in charge results in a change in potential difference between the electrodes. The charge on each pixel may be read out and the resulting signal is used to modulate scanning circuits in, for example, a video monitor and for a visual image of the infra red scans.

Figure 6:
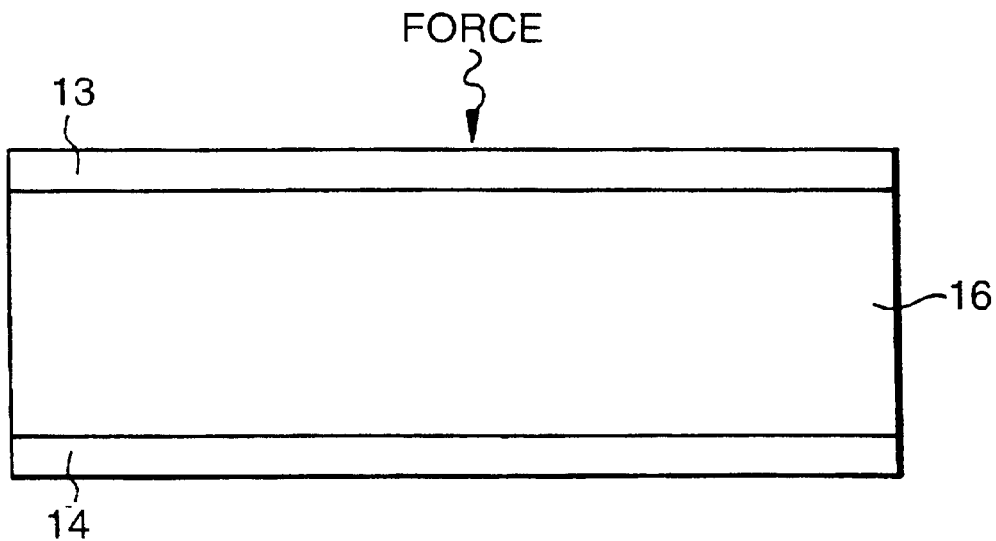
FIG. 6: illustrates a piezoelectric device.
Figure 7:
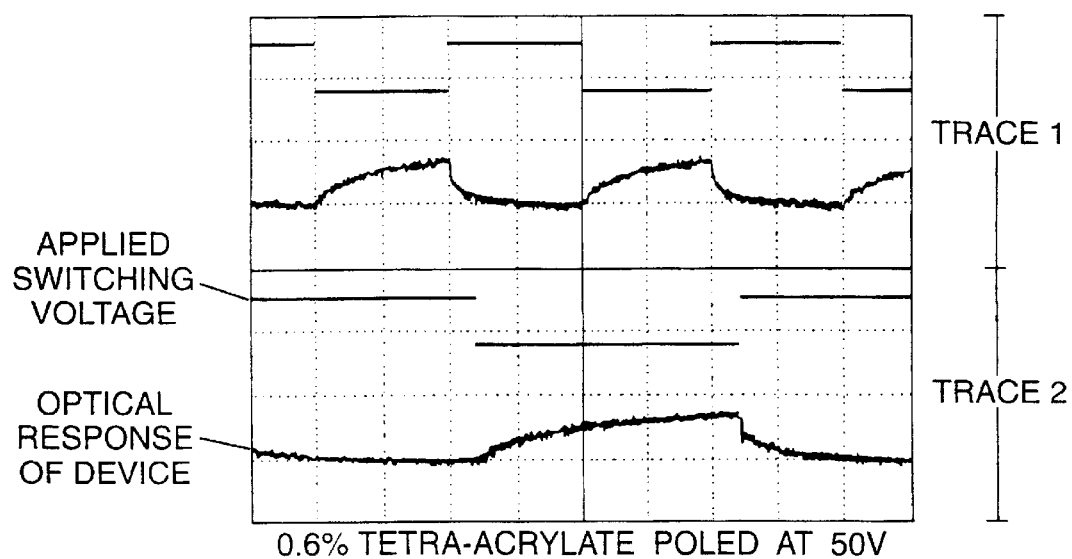
FIG. 7: illustrates the change in optical transmission through a liquid crystal cell in response to an applied AC square wave switching voltage. Trace 2 is a magnification of trace 1.

FIG. 6 illustrates a simple piezoelectric device in which the materials of the present invention may be incorporated. Such a detector may also be made according to the methods described by the present invention. A piezoelectric detector consists of electrode plates 13,14 at least one of which may be pixellated. In operation the detector is exposed to force for example stress, which is absorbed by the electrode 13. This results in a deformation which is transmitted to a layer of piezoelectric material 16. The deformation results in a change in molecular packing and therefore a change in Ps and a charge is generated; this constitutes the primary piezoelectric effect. A change in charge results in a change in potential difference between the electrodes. The charge on each pixel may be read out and the resulting signal is used to modulate scanning circuits in, for example, sonar devices, hydrophones etc.

What is claimed is:

1. A method of making an electro-optic device comprising a layer of a thin elastomer film having an aligned chiral smectic C phase, the method comprising the steps of:
    (a) forming a cell comprising two cell walls spaced apart, the walls' inner surfaces having formed thereon electrode structures;
    (b) providing a mixture comprising a smectic liquid crystal monomer material and cross-linking agent;
    (c) introducing the mixture of step (b) between the cell walls, and thereafter
    (d) polymerizing the mixture such that an amount of elastomer is formed.

2. The method according to claim 1 wherein at least one wall is surface treated to provide liquid crystal alignment.

3. The method according to claim 1 wherein the mixture additionally contains a photoinitiator.

4. The method according to claim 1 wherein the polymerization is carried out under UV light.

5. The method according to claim 4 wherein the polymerization is carried out with the addition of heat.

6. The method according to claim 1 wherein the mixture additionally contains a thermal initiator.

7. The method according to claim 1 comprising the additional step of aligning the smectic liquid crystal monomer material by heating to the isotropic phase and cooling slowly to a liquid crystalline phase.

8. The method according to claim 1 comprising the additional step of aligning the smectic liquid crystal monomer material by heating to a liquid crystal phase and cooling slowly to another liquid crystalline phase.

9. The method according to claim 1 wherein during the polymerization process the monomer material is maintained in an aligned state in a liquid crystal phase.

10. The method according to claim 1 wherein the polymerized mixture is aligned.

11. The method according to claim 7 or 8 wherein the polymerized mixture is aligned.

12. The method according to claim 1 wherein at least one of the cell walls is flexible.

13. A method of making a thin layer of elastomer film comprising an aligned chiral smectic C phase, the method comprising the steps of:
    (a) forming a cell comprising two cell walls of which at least one of the cell walls is flexible, said cell walls being spaced apart;
    (b) providing a mixture comprising a smectic liquid crystal monomer material and cross-linking reagent;
    (c) introducing the mixture between the cell walls;
    (d) polymerizing the mixture; and
    (e) removing the elastomer film from between the cell walls.

14. The method according to claim 1 or claim 13 wherein during the polymerization of the mixture either a DC or AC bias is applied or a thermal bias is applied across the cell.

15. The method according to claim 1 or claim 13 wherein during polymerization of the mixture any combination of DC, AC and thermal bias is applied across the cell.

16. The method according to claim 13 wherein at least one wall is surface treated to provide liquid crystal alignment.

17. A device comprising two spaced cell walls of which at least one of the cell walls is flexible, said cell walls being spaced apart, and a layer of a liquid crystal elastomer comprising an aligned chiral smectic phase enclosed between the cell walls.

18. A method of making an electro-active device comprising a thin elastomer film having a smectic liquid crystal, said process comprising the steps of:
    (a) forming a cell comprising two cell walls spaced apart, the walls inner surfaces having formed thereon electrode structure
    (b) providing a mixture comprising a smectic liquid crystal monomer material and cross linking agent;
    (c) introducing the mixture between the cell walls; and
    (d) polymerizing the mixture such that an amount of elastomer is formed.

19. The method according to claim 18 wherein the electro-active device is a sensor.

20. The method according to claim 19 wherein the sensor is either a pyroelectric or piezoelectric device.

21. The method according to claims 18, 19 or 20 wherein during the polymerization of the mixture either a DC or AC bias is applied or a thermal bias is applied across the cell.

22. The method according to claim 18, 19 or 20 wherein during the polymerization of the mixture any combination of DC, AC and thermal bias is applied across the cell.

23. A device comprising a cell wall, said cell wall having deposited thereon a layer of a liquid crystal elastomer comprising an aligned chiral sectic phase.

24. A device according to claim 23 wherein an electrode structure is sandwiched between the liquid crystal elastomer and the cell wall.

25. A device according to either of claims 23 or 24 wherein a conductive layer is deposited on the exposed elastomer layer.

* * * * *